United States Patent
Aumasson

(10) Patent No.: US 11,321,323 B2
(45) Date of Patent: May 3, 2022

(54) METHOD AND SYSTEM FOR SEARCHING FOR AT LEAST A SPECIFIC DATUM IN A USER UNIT

(71) Applicant: NAGRAVISION SA, Cheseaux-sur-Lausanne (CH)

(72) Inventor: Jean-Philippe Aumasson, Vuibroye (CH)

(73) Assignee: Nagravision S.A., Cheseaux-sur-Lausanne (CH)

(*) Notice: Subject to any disclaimer, the term of this patent is extended or adjusted under 35 U.S.C. 154(b) by 95 days.

(21) Appl. No.: 16/548,903

(22) Filed: Aug. 23, 2019

(65) Prior Publication Data
US 2020/0151171 A1    May 14, 2020

Related U.S. Application Data

(63) Continuation of application No. 15/076,985, filed on Mar. 22, 2016, now abandoned.

(30) Foreign Application Priority Data

Mar. 26, 2015 (EP) .................................... 15160956

(51) Int. Cl.
*G06F 16/2455* (2019.01)
*G06F 16/248* (2019.01)
(Continued)

(52) U.S. Cl.
CPC ........ *G06F 16/2455* (2019.01); *G06F 16/248* (2019.01); *G06F 21/6227* (2013.01);
(Continued)

(58) Field of Classification Search
CPC ............... G06F 16/2455; G06F 16/248; G06F 21/6227; G06F 21/6254; H04L 9/0838;
(Continued)

(56) References Cited

U.S. PATENT DOCUMENTS 6,104,810 A * 8/2000 DeBellis ................. G06F 7/582
380/43
6,493,825 B1   12/2002 Blumenau et al.
(Continued)

FOREIGN PATENT DOCUMENTS

EP          2335165 A1     6/2011
WO     2010 076130 A1     7/2010

OTHER PUBLICATIONS

"SipHash: A Fast Short-input PRF" downloaded from http://131002.net/siphash/ on Jun. 21, 2016 (5 pages).

*Primary Examiner* — Hanh B Thai
(74) *Attorney, Agent, or Firm* — Hoyng Rokh Monegier Bv; David P. Owen

(57) ABSTRACT

A system and method for searching for a specific datum among data stored in a permanent memory of a user unit linked to a central authority, comprising: receiving in the user unit, a processing key derived, in said central authority, using a key derivation function applied on a secret piece of information, said key derivation function being a first iterative one-way function; storing said processing key in a temporary memory of the user unit; receiving from said central authority the specific datum converted by a second one-way function using said processing key; in the user unit, converting at least a part of the data stored in the permanent memory using said second one-way function and said processing key; comparing said converted specific datum received from the central authority with the converted data from the permanent memory, thereby providing a search result; and deleting said processing key from the temporary memory.

20 Claims, 3 Drawing Sheets

(51) Int. Cl.
*G06F 21/62* (2013.01)
*H04L 9/08* (2006.01)
*H04L 9/32* (2006.01)

(52) U.S. Cl.
CPC ........ *G06F 21/6254* (2013.01); *H04L 9/0838* (2013.01); *H04L 9/0863* (2013.01); *H04L 9/3273* (2013.01); *H04L 2209/38* (2013.01)

(58) Field of Classification Search
CPC .. H04L 9/0863; H04L 9/3273; H04L 2209/38
USPC .......................................... 707/689, 698, 706
See application file for complete search history.

(56) References Cited

U.S. PATENT DOCUMENTS

| | | | | |
|---|---|---|---|---|
| 7,499,542 B2* | 3/2009 | Vaudenay | ............. | H04L 9/0625 380/28 |
| 7,512,241 B2* | 3/2009 | Vaudenay | ............. | H04L 9/0668 380/277 |
| 7,577,846 B2* | 8/2009 | Kudelski | ................ | H04N 7/163 380/241 |
| 7,593,938 B2* | 9/2009 | Lemar | ................... | G06F 16/166 |
| 7,720,222 B2* | 5/2010 | Wirz | ..................... | H04L 1/0066 380/200 |
| 7,844,617 B2* | 11/2010 | Lemar | ................... | G06F 16/166 707/759 |
| 8,135,825 B2* | 3/2012 | Wendling | ................ | H04L 63/10 709/224 |
| 8,176,331 B2* | 5/2012 | Moreillon | .............. | H04N 7/163 713/182 |
| 8,484,484 B2* | 7/2013 | Conus | ................. | H04N 7/1675 713/189 |
| 8,489,836 B2* | 7/2013 | Gremaud | ................ | G06F 21/79 711/163 |
| 8,621,189 B2* | 12/2013 | Lambert | ............... | H04L 9/0863 713/1 |
| 8,843,997 B1 | 9/2014 | Hare | | |
| 9,247,280 B2* | 1/2016 | Le Buhan | .......... | H04N 21/4623 |
| 9,355,271 B2* | 5/2016 | Yavuz | ................ | G06F 21/6227 |
| 9,442,980 B1* | 9/2016 | Trepetin | ............. | G06F 21/6254 |
| 9,491,174 B2* | 11/2016 | Aumasson | ............. | G06F 21/31 |
| 9,940,195 B2* | 4/2018 | Resch | ................. | G06F 12/1408 |
| 10,148,437 B2* | 12/2018 | Pogmore | .......... | H04L 9/0643 |
| 10,795,873 B1* | 10/2020 | Matthews | ........... | G06F 16/2379 |
| 2003/0190042 A1 | 10/2003 | Tagashira et al. | | |
| 2004/0172400 A1* | 9/2004 | Zarom | ............. | G06F 16/90339 |
| 2004/0172535 A1 | 9/2004 | Jakobsson et al. | | |
| 2005/0166263 A1 | 7/2005 | Nanopoulos et al. | | |
| 2008/0092216 A1 | 4/2008 | Kawano et al. | | |
| 2008/0154978 A1* | 6/2008 | Lemar | .................... | G06F 16/166 |
| 2009/0044013 A1* | 2/2009 | Zhu | ....................... | H04M 15/47 713/170 |
| 2009/0232314 A1 | 9/2009 | Kato et al. | | |
| 2010/0130207 A1* | 5/2010 | Wu | ..................... | H04W 12/062 455/436 |
| 2010/0241632 A1* | 9/2010 | Lemar | ................ | G06F 16/166 707/747 |
| 2012/0155637 A1* | 6/2012 | Lambert | ............... | H04L 9/0869 380/44 |
| 2012/0198197 A1* | 8/2012 | Gladwin | ................ | G06F 16/13 711/170 |
| 2013/0238646 A1 | 9/2013 | Maro | | |
| 2013/0332729 A1* | 12/2013 | Ito | .......................... | H04L 9/002 713/165 |
| 2014/0115666 A1 | 4/2014 | Morchon et al. | | |
| 2014/0136510 A1 | 5/2014 | Parkkinen et al. | | |
| 2014/0172830 A1* | 6/2014 | Yoshino | ............ | G06F 16/90335 707/722 |
| 2014/0244935 A1* | 8/2014 | Ezra | ........................ | G06F 3/065 711/133 |
| 2014/0245023 A1 | 8/2014 | Nagai et al. | | |
| 2014/0365541 A1* | 12/2014 | Darcy | ................... | G06F 16/182 707/827 |
| 2015/0143112 A1* | 5/2015 | Yavuz | ...................... | H04L 9/00 713/165 |
| 2015/0254453 A1 | 9/2015 | Sugiyama | | |

* cited by examiner

METHOD AND SYSTEM FOR SEARCHING FOR AT LEAST A SPECIFIC DATUM IN A USER UNIT

CROSS-REFERENCE TO RELATED APPLICATIONS

This application claims priority to European Application No. 15160956.7 filed Mar. 26, 2015, which is incorporated by reference in its entirety.

TECHNICAL FIELD

The present disclosure concerns a system and method for determining whether a specific datum is present among data stored in a memory of a user unit.

BACKGROUND ART

Several methods already exist for searching for a specific datum or data among data stored in a permanent memory of a user unit. According to one of these methods, the specific datum or data to be found is sent from a central unit or central authority to a user unit. The specific datum to be found is then compared to the data stored in a permanent memory of the user unit. A response is sent to the central authority, either only in the case where a match is found or also in the case where no match is found.

This method has the drawback of exposing the data to be found during the process of searching. In other words, the data to be found appears in clear during the search. In some applications, this is not acceptable. This can be the case for example in medical applications, in the field of banking, for customer names etc., and more generally, in any application in which data should be kept secret. Moreover, this method requires that the user unit be trusted, which is not optimal from a security point of view.

A second method is used to avoid exposing data during the search. This method consists in converting the specific datum or data to be found, using a one-way function such as a cryptographic hash function. The result of the conversion is a fingerprint, which is sent to the user unit upon which the search process is to be performed. Data stored in a permanent memory of the user unit, through which the search is to be performed, is also converted by the same one-way function. The fingerprint of the specific datum or data to be found is then compared to the fingerprint of the stored data and a response or a report is sent from the user unit to the central authority at least if this process produces a match.

Thanks to this one-way function, the datum or data to be found is not exposed during the search and it is not possible to retrieve the original datum or data if a fingerprint is intercepted by a malicious third party. However, a malicious third party, suspecting that a hash function might be being used for such searches, can test whether a given piece of information is stored in the user unit. He simply has to hash the given piece of information and to check if the hash corresponds to a fingerprint of data stored in the user unit. In other words, this method allows for "verifiability".

DISCLOSURE

The present disclosure proposes to solve drawbacks of the methods of the prior art summarized above, by proposing a method and a system enabling the determination of whether a specific datum or specific data is present in a memory of a user unit, without exposing said data and preventing a malicious party from being able to test whether the search process has been protected using known obfuscation methods, i.e. prevents verifiability.

According to an aspect of the disclosure, provision is made for a method as defined in the preamble and comprising:

- receiving in said user unit, a processing key derived, in said central authority, by means of a key derivation function applied on at least a secret piece of information, said key derivation function being a first iterative one-way function;
- storing said processing key in a temporary memory of the user unit;
- receiving from said central authority, said at least one specific datum converted by a second one-way function using said processing key;
- in the user unit, converting at least a part of the data stored in the permanent memory of the user unit, by said second one-way function and said processing key;
- in the user unit, comparing said converted at least one specific datum received from the central authority with the converted data from the permanent memory of the user unit, thereby providing a search result;
- deleting said processing key from the temporary memory of the user unit.

According to another aspect of the disclosure, provision is made for a system as defined in the preamble and comprising:

- a central authority comprising at least a central unit linked to said user unit;
- the central authority comprising a key derivation module having at least a secret piece of information and configured to perform a key derivation function, said key derivation function being a first iterative one-way function;
- the central authority further comprising a conversion module for converting said at least one specific datum using a second one-way function, and a processing key derived by the key derivation module;
- a secured communication channel between the central authority and the user unit;
- the user unit comprising a temporary memory for storing said processing key;
- the user unit further comprising a conversion module for converting at least a part of the data stored in the permanent memory of the user unit, said conversion using at least said second one-way function and said processing key;
- the user unit further comprising a comparison module for comparing said converted at least one specific datum received from the central authority with the converted data from the permanent memory of the user unit;
- the user unit further comprising a reporting module for storing a report indicating a result of the comparison;
- the user unit further comprising processing key erasing means for deleting the processing key from said temporary memory.

According to still another aspect of the disclosure, provision is made for a method as defined in the preamble and comprising:

- in said central authority, deriving a processing key by means of a key derivation function applied on at least a secret piece of information, said key derivation function being a first iterative one-way function;
- sending said processing key to the user unit through a secured communication channel and storing said processing key in a temporary memory of the user unit;

in said central authority, converting said at least one specific datum by a second one-way function using said processing key;

sending the converted at least one specific datum to the user unit through said secured communication channel;

in the user unit, converting at least a part of the data stored in the permanent memory of the user unit, by said second one-way function and said processing key;

comparing said converted at least one specific datum received from the central authority with the converted data from the permanent memory of the user unit, thereby providing a search result;

deleting said processing key from the temporary memory of the user unit.

According to the present disclosure, the data to be found is converted by a central authority or a search authority prior to being sent to the user unit upon which the search process is to be performed. This conversion is done in such a way that it is not possible, or extremely difficult, for a malicious third party to obtain the initial data or clear data from the converted data. Moreover, the method disclosed avoids verifiability. This means that it is also difficult or impossible for a malicious third party to send forged data to a user unit and to obtain a correct response from this user unit. In other words, a malicious third party will not be able to obtain secret information enabling him either to extract information in clear or to verify information he has forged.

According to the disclosure, user units can be considered as malicious entities and the communication channel between the central authority and the user units can be considered as insecure prior to being secured.

Despite this, the disclosure offers a good level of security, as user units do not need to store secret information. Therefore, trust in user units is not required.

The method disclosed herein prevents a malicious user to check whether data is present, which means that even if a malicious user is able to send data to a user unit's database, he will not be able to forge data corresponding to a real specific datum. Accordingly, he will not be able to check if a specific datum is present in a user unit's memory.

The method of the disclosure enables rapid scanning of the data stored in the permanent memory of the user unit. This can be important in the case that the quantity of data to be scanned is large. This can also be important as it minimizes the time during which sensitive data is exposed.

BRIEF DESCRIPTION OF DRAWINGS

The present disclosure and its advantages will be better understood thanks to the enclosed drawings and to the detailed description of specific embodiments, in which.

MODE FOR CARRYING OUT THE DISCLOSURE

Figure 1:
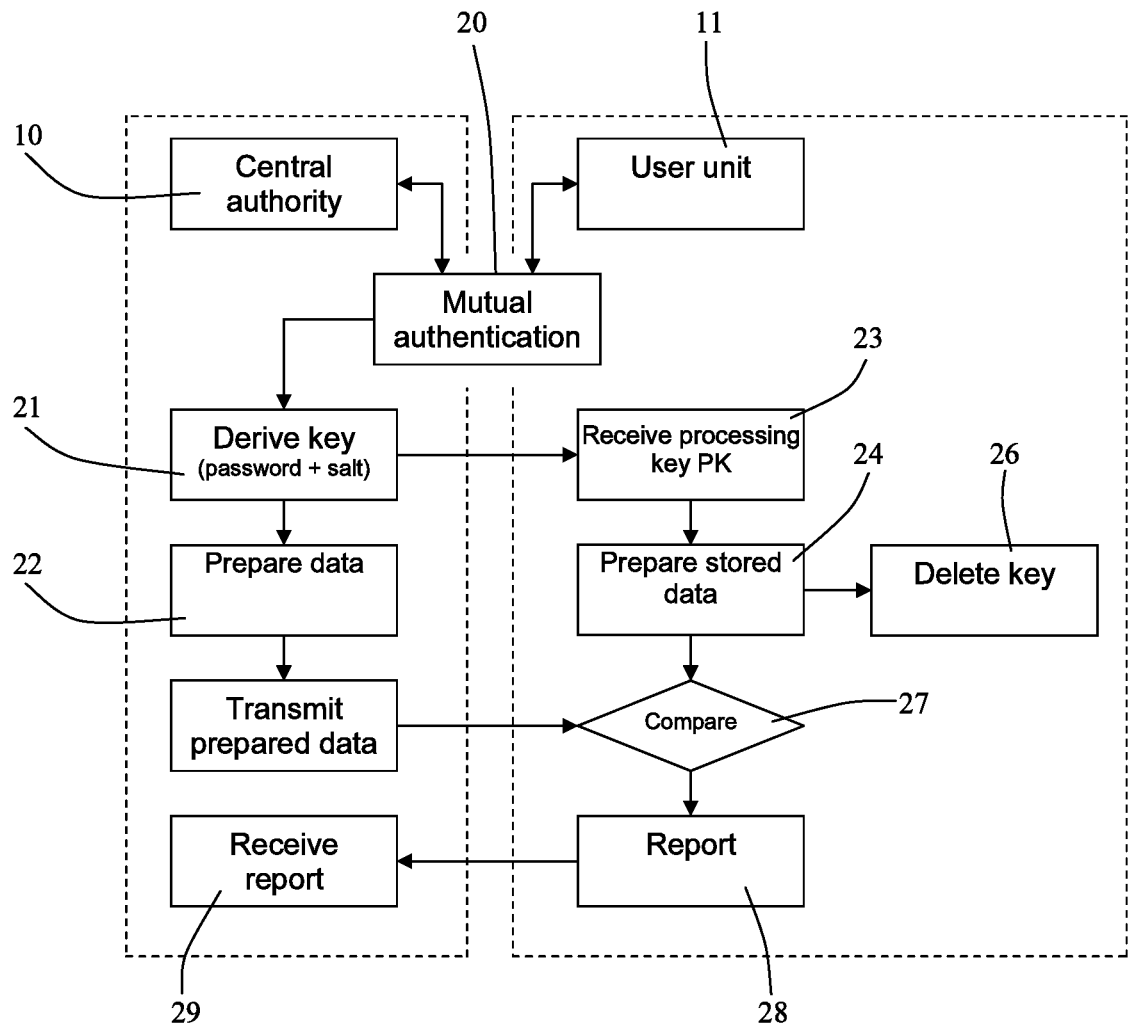
FIG. 1 is a block diagram illustrating the method of the disclosure.

With reference to the drawings, a system of the present disclosure comprises at least two entities, namely a central authority 10 and at least one user unit 11. The central authority 10 can comprise one or several central units such as computers or servers. This central authority is linked to at least one user unit 11, and possibly several user units. Herein, the term "linked" means that the user unit and the central authority can communicate with each other and can exchange data. Therefore, the central authority and the user unit both comprise remote and/or local communication means which enable a bidirectional exchange of data between them.

The central authority 10 comprises a key derivation module 12 containing at least a secret piece of information such as a password, and is configured to perform a key derivation function. According to a preferred embodiment, the key derivation module 12 further comprises a random value generator.

The key derivation function is a first iterative one-way function such as a hash function using several iterations to generate a fingerprint. The number of iterations is not strictly defined. In a preferred embodiment, the number of iterations is greater than 1000, and preferably greater than 10'000. Several iterative one-way functions can be used, such as for example functions known under the acronym SHA-1 or SHA-256. Another suitable function is known under the name SipHash and is documented on http://131002.net/siphash. In this function, the number of iterations can easily be tuned.

The central authority 10 further comprises a conversion module 13 configured to perform a conversion function which is a second one-way function.

The user unit 11 comprises a permanent memory 14 in which data is stored. The search for the specific datum or data will be performed on a set of data or a subset of the set of data stored in this permanent memory.

The user unit 11 further comprises a conversion module 15 containing the same second one-way function as the second one-way function of the central authority's conversion module.

The user unit 11 comprises a temporary memory 16 in which a processing key can be stored for a limited time. This processing key is deleted from the temporary memory 16 when it is not useful anymore. The temporary memory is emptied in any case when the user unit is switched off.

The user unit 11 further comprises a comparison module 17 for comparing data coming from the user unit 11 with data coming from the central authority 10.

Finally, the user unit 11 comprises a reporting module 18 for storing a report concerning the comparison of the data and possibly, of sending the report to the central authority 10.

The system described herein further comprises a secured communication channel 19 used for securely exchanging data between the central authority 10 and the user unit 11.

The method of the disclosure comprises two phases, a first phase taking place essentially in the central authority 10 and a second phase taking place essentially in a user unit 11.

In a preferred embodiment, a first step, which precedes the actual method of searching data of the present disclosure, consists in preparing the devices for secured communication or, in other words, establishing a secured communication channel between the central authority and the user unit. This preparation comprises a step 20 of mutual authentication of the devices in order to establish the secured communication channel 19.

Several mutual authentication methods are known. One of these known methods comprises the following steps: the central authority generates a root key RK from a master secret and an identifier of the user unit. This root key RK is sent to the user unit. The central authority and the user unit know the same pseudo-random function PRF. A suitable pseudo-random function can be SipHash with a 128-bit output size.

The central authority generates a random number r1 and calculates a value c1=PRF(RK; r1). The pair of values (c1; r1) is sent to the user unit.

The user unit receives a pair of values (c1'; r1'). It calculates c1"=PRF(RK; r1') and checks if the calculated c1" is equal to the received c1'. If this is the case, the authentication protocol continues. If this is not the case, the authentication protocol can be aborted or another attempt can be made.

If the communication continues, the user unit generates a random number r2 and calculates the concatenation of r1' and r2 (r1'∥r2). The user unit then applies the pseudo-random function PRF to RK and to r1'∥r2 to obtain a value c2. c2=PRF(RK; r1'∥r2). The user unit sends the pair of values c2, r2 to the central authority.

The central authority receives c2' and r2'. It then calculates c2"=PRF(RK; r1∥r2') and checks if the calculated c2" is equal to the received c2'. If this is the case, the authentication protocol continues. If this is not the case, the authentication protocol can be aborted or another attempt can be made.

The equalities c1=c1" and c2'=c2" are true if and only if r1=r1' and r2=r2'. This means that if the equalities are confirmed, both the central authority 10 and the user unit 11 have the same random numbers r1 and r2. A session key SK is calculated in the central authority and in the user unit, this key being:

$$SK=PRF(RK; r2\|r1).$$

Once the session key SK is established, communications between the central authority and the user unit are protected using this session key.

It should be understood that other known methods for mutual authentication can also be used. In particular, methods using public-private key exchange protocol can be of interest as it enables establishing a secured communication channel without requesting the devices to share a common secret.

Once the central authority 10 and the user unit 11 are mutually authenticated, the method proper for searching for data can begin. In a first phase, the key derivation module 12 of the central authority 10 derives a processing key PK in a step 21. This processing key PK can be derived from a password that can be specific to the user unit 11 upon which the search process is performed. It can also be common to a group of user units or even to all the user units linked to that central authority 10. The deriving of the processing key PK may further use "salt", which is usually a random number generated by the random number generator of the key derivation module 12. This salt enables the generation of different processing keys even if the password is the same. This is interesting for example in the case where several user units share the same password. This is also interesting even if the passwords are different for each user unit, as every time a communication is initiated with a same user unit, the salt enables deriving a different processing key.

The processing key is derived by the first iterative one-way function. This function has several important features. First, it is a one-way function, which means that it is not possible, by knowing the value of the processing key and the result of the function on a password, to calculate or to determine the password in clear. Secondly, it is an iterative function. The number of iterations can be set arbitrarily. The aim of using an iterative function is to "consume" time for generating a processing key. Consuming time prevents a fraudulent user from generating a large number of processing keys over a short period, for a usual scenario used in a brute force attack or a dictionary attack, for example. With a 128-bits key, the number of possible keys is $2^{128}$. Thus, an attacker using brute force attack would statistically have to generate the half of this possible number of keys, i.e. $2^{127}$ to have a reasonable chance to forge a valid key. This huge number of keys makes such an attack not realistic.

Another solution for an attacker is to try passwords. It is estimated that the number of possible passwords is around $2^{40}$. This makes a password or dictionary attack much more realistic for an attacker.

The time required for generating a number of processing keys, among which there would be a non-negligible probability of finding a correct processing key, should be much greater than the time required to use a processing key found in such a manner. In the case of brute force attack, this time for generating a valid key makes an attack unrealistic. In the case of a dictionary attack, this time for generating a valid processing key can be increased by increasing the number of iterations.

Once the processing key is derived in the key derivation module 12, the specific datum to be found is converted in a step 22, in the conversion module 13 of the central authority 10. The conversion uses a second one-way function such as a hash, this hash using the processing key PK derived from the password, the salt and the first iterative one-way function in step 21. The search can be carried out on a single specific datum or on a plurality of data. In any case, each specific datum or data is converted individually. Each converted specific datum or data can be aggregated in a list prior to being sent to the user unit for the search, or can be sent individually.

Figure 2:
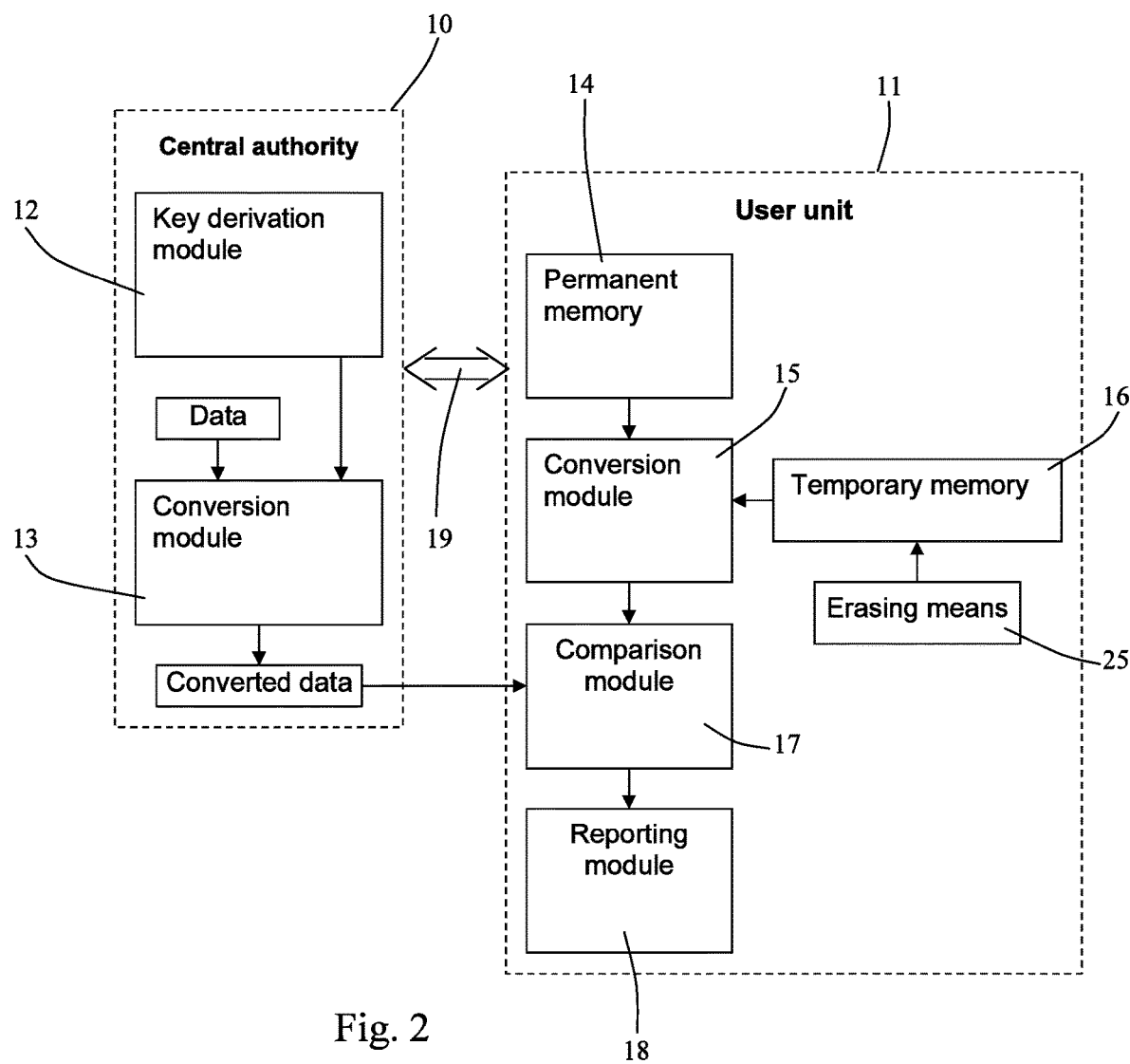
FIG. 2 illustrates a system in which an embodiment of the disclosure may be deployed.

The converted data as well as the processing key PK are sent to the user unit 11 in which the search is to be carried out. This transmission is made through the secured communication channel 19 between the central authority 10 and the user unit 11. The reception of the processing key PK corresponds to step 23 on FIG. 2. It should be noted that the processing key PK obtained by the first iterative one-way function is sent to the user unit 11 but neither the password nor the salt are sent. It should also be noted that the processing key PK and the converted data can be sent simultaneously or separately, as illustrated by FIG. 2.

In a specific embodiment, the central authority 10 also sends an indication concerning the type of data that is to be found during the search. This type of data can be for example a name, an account number, other numbers related to banking, such as IBAN, etc. Indicating the type of data facilitates the search as only the data corresponding to the searched format are scrutinized. This also shortens the time required for the search.

In the case where several specific pieces of data to be found are aggregated in a list of data, each specific datum is advantageously related to an index. This index is advantageously sent in clear with the converted data and can be used to indicate which specific datum among the list of data was found in the user unit.

The second phase of the method of the disclosure takes place in the user unit 11. In step 23, the user unit 11 receives the processing key PK derived by the central authority 10 and stores this processing key PK in the temporary memory 16 of the user unit 11. As mentioned above, the user unit 11 does not receive, and does not know, either the password or the salt that was used to derive the processing key PK. In step 24, the user unit 11 prepares a set of data through which the search will be made for the specific datum. This set of data is usually a subset of all the data stored in the permanent memory 14 of the user unit 11. In particular, if the type of data to be found is defined, for example by defining a specific format corresponding to an account number, only the data stored in the permanent memory 14 of the user unit and corresponding to that specific format will be prepared in that step 24.

The preparation of this subset of data is performed by the conversion module 15 of the user unit 11 and uses the same second one-way function and the same processing key PK that was used by the central authority 10 for preparing the specific datum in step 22. Each specific datum of the subset of data stored in the permanent memory 14 of the user unit 11 is converted by this second one-way function using the processing key PK. The result of the conversion can be stored in a memory of the user unit 11.

Once the data has been converted, the processing key PK can be deleted from the temporary memory 16 of the user unit 11. This deletion is performed by a processing key erasing means 25 and corresponds to step 26 of FIG. 2. The deletion of the processing key PK can be performed by a secured wiping of the memory. This deletion could also be performed at the end of the search for example. However, as the processing key PK is a piece of information that should be kept secret, it is preferable to store it only as long as it is necessary and to delete it once it is not useful anymore.

Once the data stored in the permanent memory 14 of the user unit 11 is converted in step 24, it can be compared using the comparison module 17, in step 27, to the converted specific datum received from the central authority 10. Several variants can then be used. According to a first embodiment, one specific datum received from the central authority 10 is compared to the converted data of the user unit 11. If a match is found, a report is sent to the central unit 10. If no match is found, either no report is sent, or a report is sent indicating the "no-match" result.

According to a second embodiment, a report is stored in the user unit in the form of a log file, in step 28. This log file is transmitted to the central unit at a later stage in step 29. This embodiment is particularly useful when several pieces of specific data are to be found. In this case, the log file may contain an index, indicating which specific datum lead to a match, among the list of specific data that was to be found.

The log file may be transmitted immediately after completion of the search or can be stored and sent later. This log file, as well as the "match" or "no-match" result in the case of a single specific datum search, can be sent in clear and even through a non-secured channel as it gives virtually no information to a third party.

An interesting feature described in this disclosure is the fact that the derivation of the processing key PK, used for hashing the specific datum by the central authority 10, uses an iterative function. This feature goes hand in hand with the fact that the user unit 11 receives the processing key PK and does not have to calculate it. This means that a malicious third party needs time to generate several processing keys that could be used for a dictionary attack or a password attack. On the other side, i.e. in the user unit 11 which receives the processing key rather than having to calculate it, the processing key PK is used over a short period and can be deleted very quickly. This also enables the search to be quick, which is advantageous as it allows for the search to be performed among a large quantity of data over a limited period without exposing sensitive data over long periods of time.

User Unit

Figure 3:
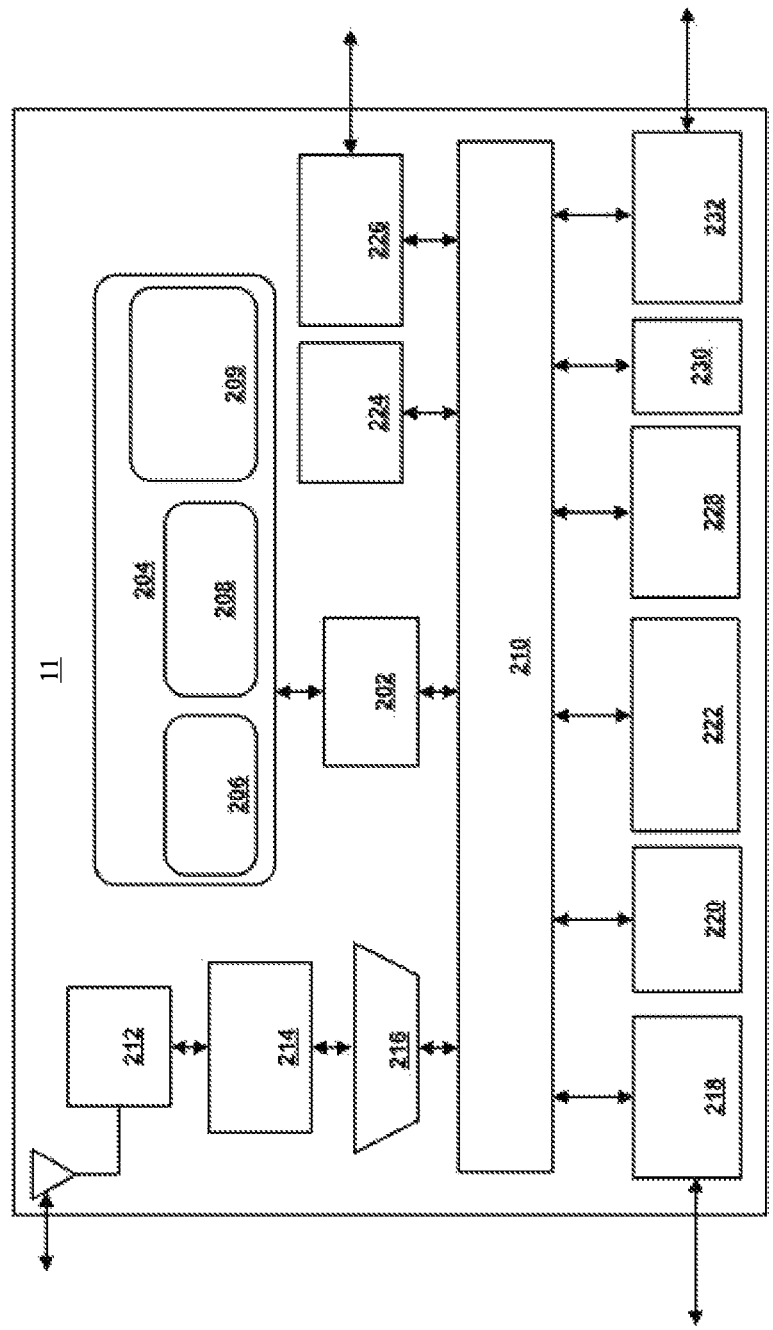
FIG. 3 illustrates a user unit as usable in the present disclosure.

For the purpose of executing the present disclosure, the user unit 11 or receiver RD, and more generally a computing device 200 is illustrated in the FIG. 3.

FIG. 3 is a block diagram illustrating an example of a computing device that may implement one or more techniques of the present disclosure. Computing device 200 is an example of a computing device that may be configured to transmit data to and receive data from a communications network, allow a user to access multimedia content, and execute one or more applications. Computing device 200 may include or be part of a stationary computing device (e.g., a desktop computer, a television, a set-top box, a gaming console, a dedicated multimedia streaming device, a digital video recorder, etc.), a portable computing device (e.g., a mobile phone, a laptop, a personal data assistant (PDA), a tablet device, a portable gaming device, etc.) or another type of computing device. In the example illustrated in FIG. 3, computing device 200 is configured to receive data via a network such as for example a television network 106 or any adequate communication network and send and receive data via a data network such as for example a public or local network 108 or LNT. The techniques described herein may be utilized by devices configured to communicate using any and all combinations of communications networks.

As illustrated in FIG. 3, computing device 200 comprises central processing unit(s) 202, system memory 204, system interface 210, modem 212, transport module 214, audio-video de-multiplexer (AV demux) 216, network interface 218, storage device(s) 220, user interface(s) 222, audio decoder 224, audio processor 226, video decoder 228, graphics processing unit 230, and display processor 232.

As illustrated in FIG. 3, system memory 204 comprises operating system 206, applications 208, and content selection application 209. Each of central processing units(s) 202, system memory 204, system interface 210, modem 212, transport module 214, AV demux 216, network interface 218, storage device(s) 220, user interface(s) 222, audio decoder 224, audio processor 226, video decoder 228, graphics processing unit 230, and display processor 232 may be interconnected (physically, communicatively, and/or operatively) for inter-component communications and may be implemented as any of a variety of suitable circuitry, such as one or more microprocessors, digital signal processors (DSPs), application specific integrated circuits (ASICs), field programmable gate arrays (FPGAs), discrete logic, software, hardware, firmware or any combinations thereof. It should be noted that although example computing device 200 is illustrated as having distinct functional blocks, such an illustration is for descriptive purposes and does not limit computing device 200 to a particular hardware architecture. Functions of computing device 200 may be realized using any combination of hardware, firmware and/or software implementations. In some examples, functionality of computing device 200 may be implemented using one or more so-called systems on a chip (SOC). For example, computing device 200 may include a set-top box including a SOC. One example of a commercially available SOC that may be included in a set-top box is the Broadcom® BCM7252 Ultra HD SoC. Central processing unit(s) 202 may be configured to implement functionality and/or process instructions for execution in computing device 200. Central processing unit(s) 202 may be capable of retrieving and processing instructions, code, and/or data structures for implementing one or more of the techniques described herein. Instructions may be stored on a computer readable medium, such as system memory 204 or storage device(s) 220. Central processing unit(s) 202 may include multi-core central processing units. As described in detail below, the techniques described herein may be used to optimize CPU usage. For example, one or more background processing techniques may be used to reduce the delay (or lag) experienced by a user interacting with one of the graphical user interfaces described below.

System memory 204 may be described as a non-transitory or tangible computer-readable storage medium. In some examples, system memory 204 may provide temporary and/or long-term storage. In some examples, system memory 204 or portions thereof may be described as non-volatile memory and in other examples portions of system memory 204 may be described as volatile memory. Examples of volatile memories include random access memories (RAM), dynamic random access memories (DRAM), and static random access memories (SRAM). Examples of non-volatile memories include magnetic hard discs, optical discs, floppy discs, flash memories, or forms of electrically programmable memories (EPROM) or electrically erasable and programmable (EEPROM) memories.

System memory 204 may be configured to store information that may be used by computing device 200 during operation. System memory 204 may be used to store program instructions for execution by central processing unit(s) 202 and may be used by software or applications running on computing device 200 to temporarily store information during program execution. For example, system memory 204 may store instructions associated with operating system 206, applications 208, and content selection application 209. System memory 204 may include one or more distinct memory devices, where each memory device may include a distinct type of memory interface. For example, system memory 204 may include an internal hard disk or solid state drive, a random access memory module, an embedded Multimedia Card (eMMC) memory device, and/or one or more caches (e.g., CPU caches and/or GPU caches). As described in detail below, images associated with a graphical user interface may be loaded from a portion of system memory 204 to another portion of system memory 204 in order to reduce the time required to render the images on a display based on received user inputs. For example, a subset of images associated with a graphical user interface may be loaded into a cache based on user behavior. It should be noted that the techniques described herein may be generally applicable to any memory architecture.

Applications 208 and content selection application 209 may include applications implemented within or executed by computing device 200 and may be implemented or contained within, operable by, executed by, and/or be operatively/communicatively coupled to components of computing device 200.

Applications 208 and content selection application 209 may include instructions that may cause central processing unit(s) 202 of computing device 200 to perform particular functions. Applications 208 and content selection application 209 may include algorithms which are expressed in computer programming statements, such as, for-loops, while-loops, if-statements, do-loops, etc. Applications 208 and content selection application 209 may be distributed to computing device 200 through an application distribution site, for example, application distribution site 122. In one example, applications 208 and content selection application 209 may cause computing device 200 to perform functions associated with the example techniques described herein that enable a user to access items of content. Applications 208 and content selection application 209 may cause one or more graphical user interfaces to be presented that enable a user to provide data for use by an application. In one example, applications 208 may include one or more dedicated applications enabling a user to access a digital media service. It should be noted that as used herein a dedicated application enabling a user to access a digital media service may be high integrated with an application or operating system of a computing device.

For example, a set-top box supported by a cable television provider may enable a user to access items of content from a television service, an on demand media service maintained by the cable television service provider, and/or a third party media streaming service. In some cases, each distinct graphical user interface enabling a user to select items of content to access may be referred to as a dedicated application, a source, and/or a portal. In one example, content selection application 209 may be provided to a computing device and cause a computing device to enable a user to select items of content according to one or more of the techniques described herein.

As described in detail below content selection application 209 may operate in conjunction with an application running on a companion device, such as a mobile device.

As further illustrated in FIG. 3, applications 208 and content selection application 209 may execute in conjunction with operating system 206. That is, operating system 206 may be configured to facilitate the interaction of applications 208 and content selection application 209 with central processing unit(s) 202, and other hardware components of computing device 200. It should be noted that in some examples, components of operating system 206 and components acting in conjunction with operating system 206 maybe referred to as middleware. Further, in some examples, content selection application 209 may include an application programming interface (API). The techniques described herein may be utilized by devices configured to operate using any and all combinations of software architectures. Operating system 206 maybe an operating system designed to be installed on laptops, desktops, smartphones, tablets, set-top boxes, digital video recorders, televisions and/or gaming devices. In one example, operating system 206 may include one or more of operating systems or middleware components developed by OpenTV®, Windows® operating systems, Linux operation systems, Mac OS®, Android® operating systems, and any and all combinations thereof.

System interface 210 may be configured to enable communications between components of computing device 200. In one example, system interface 210 comprises structures that enable data to be transferred from one peer device to another peer device or to a storage medium. For example, system interface 210 may include a chipset supporting Accelerated Graphics Port (AGP) based protocols, Peripheral Component Interconnect (PCI) bus based protocols, such as, for example, the PCI Express (PCIe) bus specification, which is maintained by the Peripheral Component Interconnect Special Interest Group, or any other form of structure that may be used to interconnect peer devices.

Storage device(s) 220 represent memory of computing device 200 that may be configured to store relatively larger amounts of information for relatively longer periods of time than system memory 204. For example, in the example where computing device 200 is included as part of a digital video recorder, storage device(s) 220 may include a hard disk drive configured to store numerous video files. Similar to system memory 204, storage device(s) 220 may also include one or more non-transitory or tangible computer-readable storage media. Storage device(s) 220 may include internal and/or external memory devices and in some examples may include volatile and non-volatile storage elements.

User interface(s) 222 may include devices configured to receive input from a user during operation of computing device 200. For example, user interface(s) 222 may include buttons and switches, motion sensors (e.g., accelerometers), touch-sensitive sensors, a track pad, a mouse, a keyboard, a microphone, a video camera, or any other type of device configured to receive user input. User interface(s) 222 may be integrated into computing device 200. For example, in the case where computing device 200 includes a television, user interface(s) 222 may include push buttons located on the television. Further, user interface(s) 222 may be integrated into devices external to computing device 200. For example, user interface(s) 222 may be integrated into a companion device, such as, for example, companion device 300 and companion device 400. In some examples, an external device including user interfaces(s) 222 may be operatively coupled to computing device 200 using a standardized communication protocol, such as for example, Universal Serial Bus protocol (USB), Bluetooth, ZigBee or a proprietary communications protocol, such as, for example, a proprietary infrared communications protocol. It should be noted that techniques described herein may be generally applicable regardless of the type of device including a user interface and regardless of the manner in which the device communicates with computing device 200. As described in detail below, user interface(s) 222 may include a display configured to display the graphical users interfaces described herein. For example, in the case where computing device 200 includes a television, a companion device (e.g., a smart phone or a dedicated remote controller) in communication with a television may include a user interface including a touch-sensitive display presenting a graphical user interface described herein. Further, as described in detail below, a user may provide commands to computing device 200 by activating portions of a touch-sensitive display.

Referring again to FIG. 3, computing device 200 is configured to send and receive data via a local network, such as, for example, television network 106 described above and send and receive data via a public network, such as, for example, public network 108. This network is used also to transmit and receive data from the mobile device. A communications network may be described based on a model including layers that define communication properties, such as, for example, physical signaling, addressing, channel access control, packet properties, and data processing in a communications system. In the example illustrated in FIG. 3, modem 212, transport module 214, and AV demux 216 may be configured to perform lower layer processing associated with television network 106 and network interface 218 may be configured to perform lower layer processing associated with public network 108.

The method and the system of the disclosure are described in an embodiment in which the central authority 10 searches for a specific datum in one user unit 11. The search authority 10 can of course search for a specific datum or data in several user units. In this case, secured communication channels 19 are established between the central authority 10 and each individual user unit.

However, the different user units are not authorized to communicate with each other, this in order to prevent a user unit from "grabbing" information from another user unit.

The invention claimed is:

1. A method comprising:
    receiving, by a user unit, from a computer, a processing key derived at the computer by using a first one-way function using at least secret information;
    receiving, by the user unit, from the computer at least one specific datum converted at the computer by a second one-way function using the processing key;
    converting, at the user unit, one or more parts of data in a permanent memory of the user unit by using the same second one-way function that uses the received processing key; and
    providing, by the user unit, a search result based on comparing the converted at least one specific datum received from the computer with the converted one or more parts of data from the permanent memory of the user unit.

2. The method of claim 1, wherein the processing key is received through a secured communication channel.

3. The method of claim 2, further comprising:
    carrying out a mutual authentication between a central authority and the user unit to establish the secured communication channel, wherein the computer is included in the central authority.

4. The method of claim 1, wherein the converted at least one specific datum is received from the user unit through a secured communication channel.

5. The method of claim 1, further comprising sending to a central authority, a report concerning the search result, when the comparison leads to a match.

6. The method of claim 5, further comprising sending to the central authority, a report concerning the search result, after the comparison has been completed.

7. The method of claim 1, wherein the at least one specific datum to be found contains several pieces of data and wherein the search result contains an indication allowing for the specific piece of data having led to a match to be identified.

8. The method of claim 7, wherein the indication is an index associated with and specific to each specific datum to be found.

9. The method of claim 1, wherein the first one-way function is an iterative one-way function.

10. The method of claim 1, wherein the method further comprises storing the processing key in a temporary memory of the user unit.

11. The method of claim 10, wherein the method further comprises deleting the processing key from the temporary memory of the user unit.

12. The method of claim 11, wherein the deleting of the processing key from the temporary memory of the user unit is performed once the conversion of the at least a part of the data stored in the permanent memory of the user unit is completed.

13. The method of claim 11, wherein the deleting of the processing key from the temporary memory of the user unit is performed once the search is completed.

14. The method of claim 11, wherein the deleting of the processing key is made by a secured wiping of the temporary memory of the user unit.

15. A user unit comprising:
    a communication interface to receive a processing key derived at a computer by using a first one-way function using at least secret information and at least one specific datum converted at the computer based on a second one-way function using the processing key;

a permanent memory to store data;

a conversion module to convert one or more parts of data in the permanent memory, using the second one-way function that uses the processing key received from the computer; and a comparison module to compare the received converted at least one specific datum received from the computer with converted data from the conversion module;

wherein the user unit is configured to provide a search result based on the comparison by the comparison module.

16. The user unit of claim 15, further comprising:

a temporary memory to store the processing key.

17. The user unit of claim 15, further comprising:

an erasing module to erase the processing key from the temporary memory.

18. The user unit of claim 15, further comprising:

a reporting module for storing a report based on comparison of the received converted at least one specific datum with the converted data from the memory of the user unit.

19. The user unit of claim 15, wherein the communication interface provides a secured communication channel to receive the processing key and the at least one specific datum converted based on the second one-way function using the processing key.

20. The user unit of claim 15, wherein the first one-way function is an iterative one-way function.

\* \* \* \* \*